Feb. 27, 1934.   R. BLAHO   1,948,488
MACHINE FOR AND PROCESS OF FABRICATING CONTAINER
WALLS AND ACCESSORIES THEREON
Filed April 16, 1931    6 Sheets-Sheet 1

INVENTOR.
Rudolph Blaho
BY
Geo. B. Pitts
ATTORNEY.

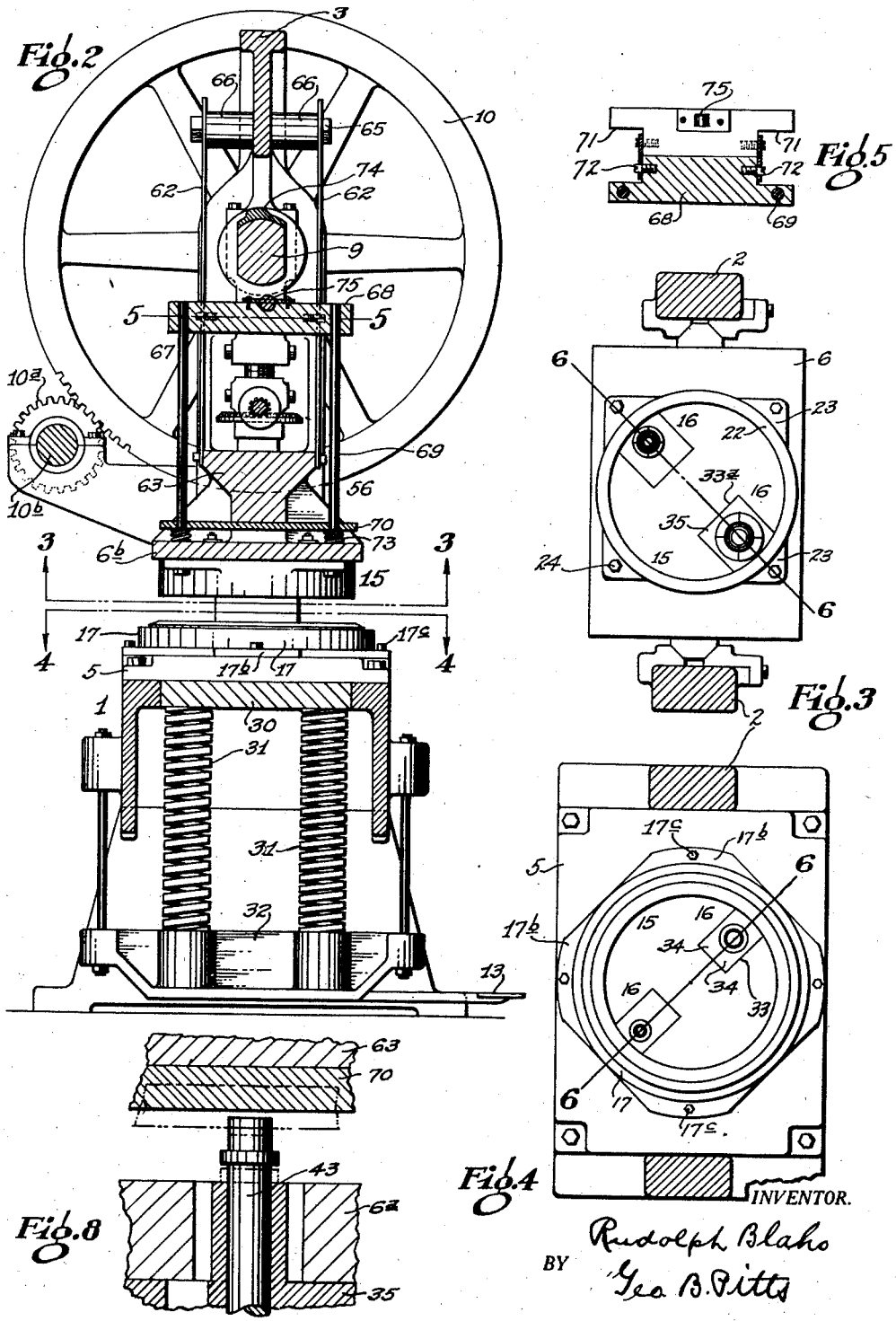

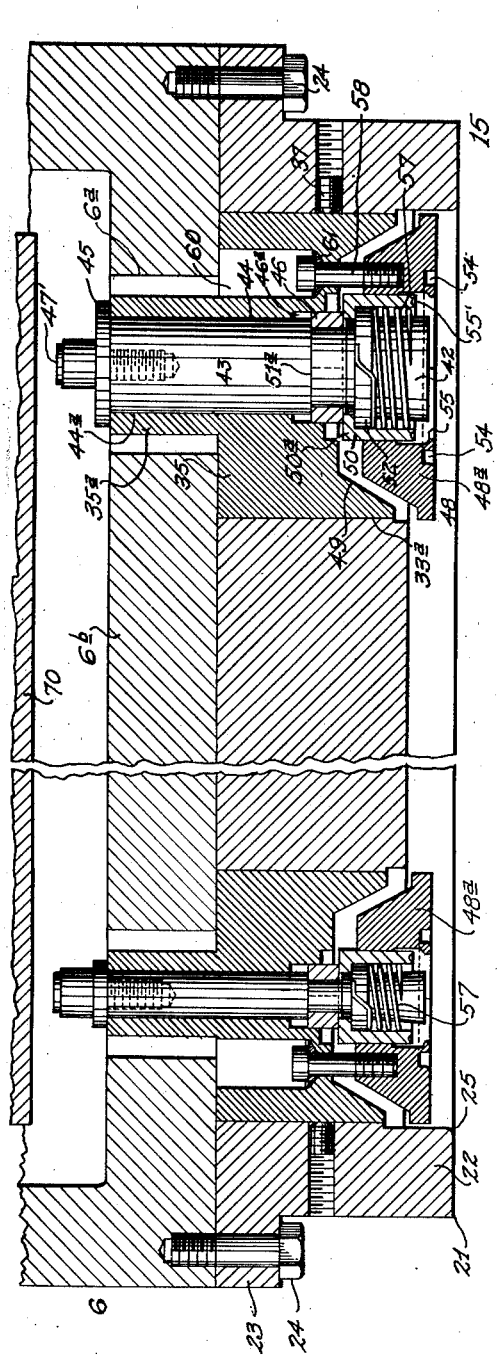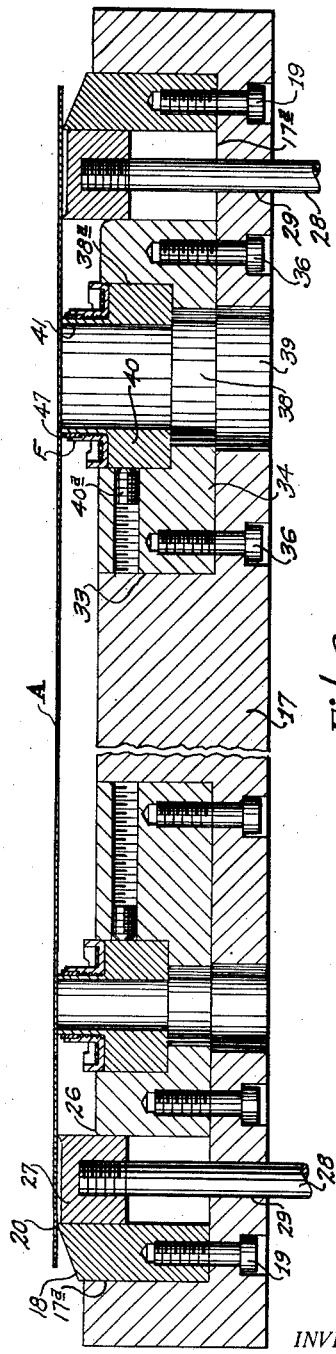
Fig. 6

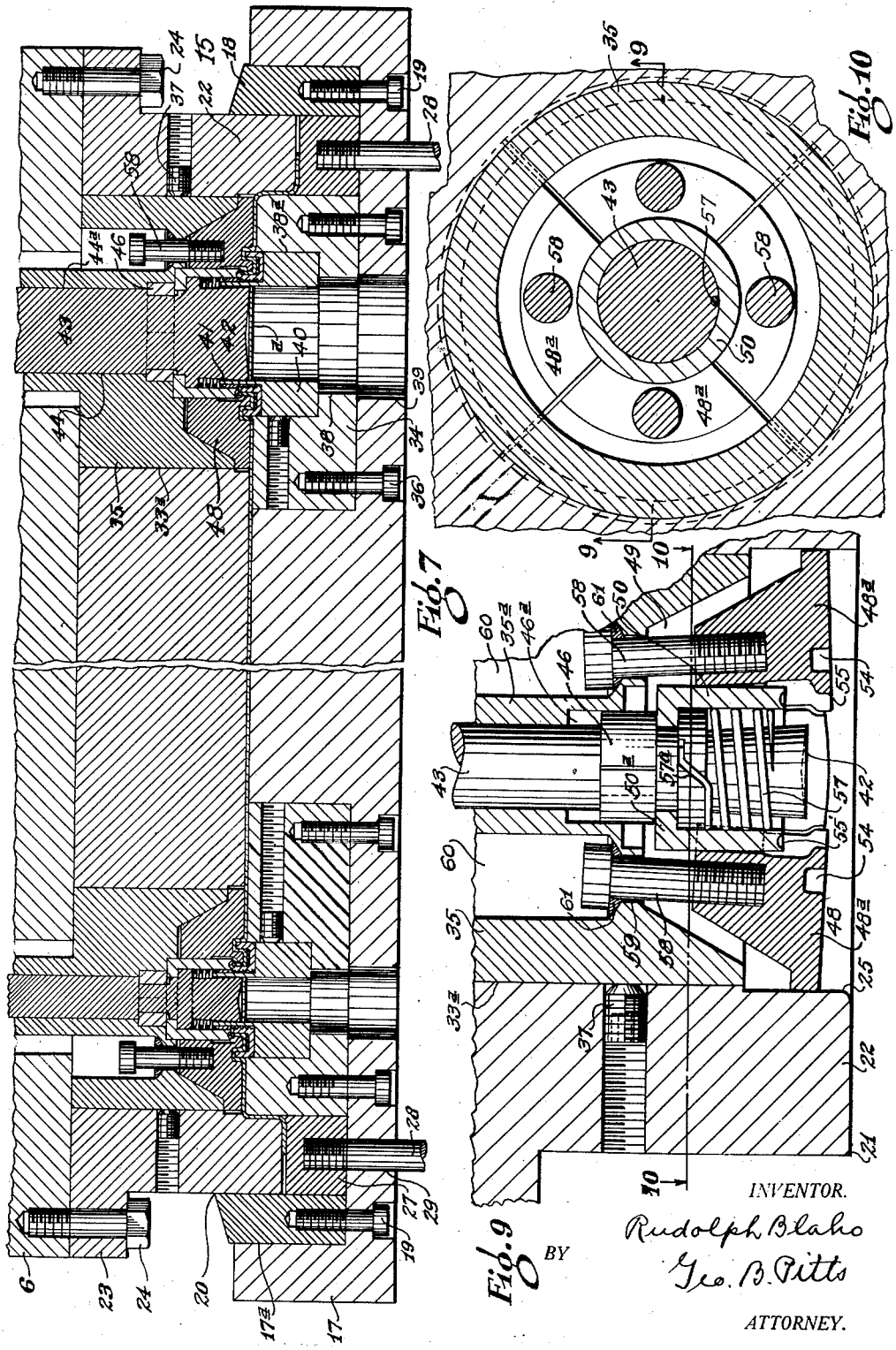

Feb. 27, 1934.  R. BLAHO  1,948,488
MACHINE FOR AND PROCESS OF FABRICATING CONTAINER
WALLS AND ACCESSORIES THEREON
Filed April 16, 1931  6 Sheets-Sheet 5
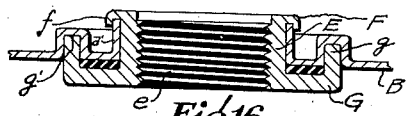
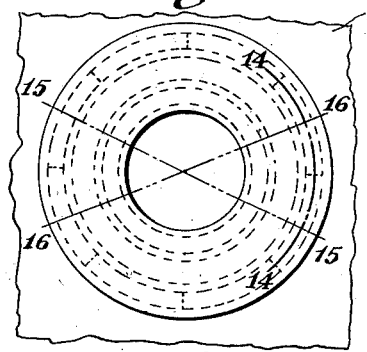
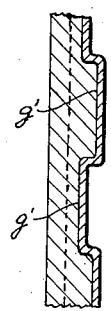
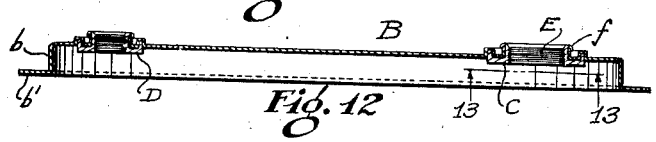
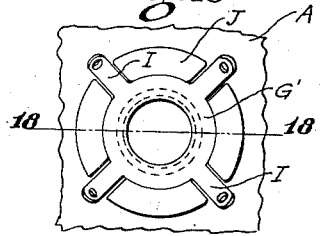
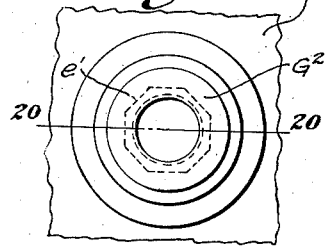
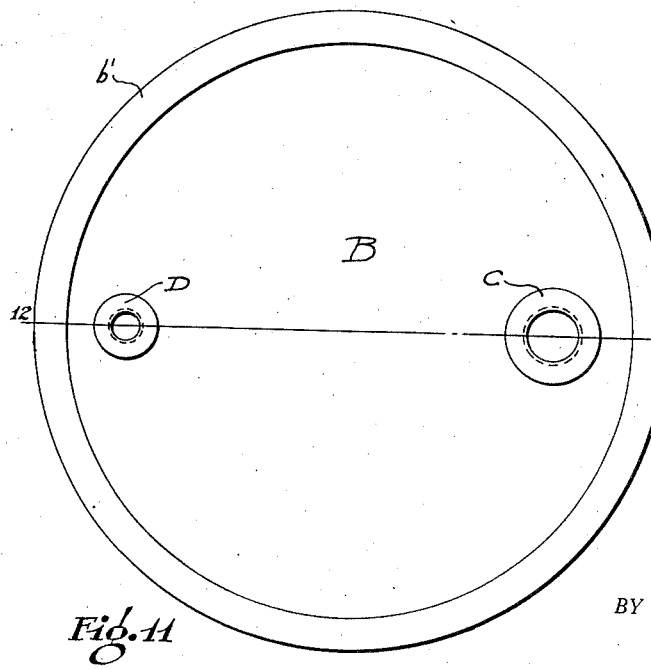
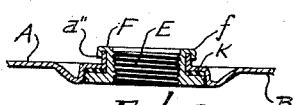
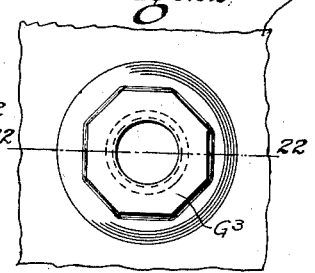
INVENTOR.
Rudolph Blaho
BY Geo. B. Pitts
ATTORNEY.

Patented Feb. 27, 1934

1,948,488

UNITED STATES PATENT OFFICE 1,948,488

MACHINE FOR AND PROCESS OF FABRICATING CONTAINER WALLS AND ACCESSORIES THEREON

Rudolph Blaho, Cleveland, Ohio, assignor to The Byrne Manufacturing Company, Cleveland, Ohio, a corporation of Ohio Application April 16, 1931. Serial No. 530,672

39 Claims. (Cl. 153—2)

This invention relates to containers having one or more walls formed of sheet metal and particularly to the method of and machine for fabricating container walls and accessories thereon. The accessories herein referred to comprise bung rings or sputs for receiving plugs, faucets or threaded portions of a fixture, but the invention is not to be so limited. Furthermore, while the sheet metal wall is conveniently referred to as one wall of a container, the invention is not limited to the use of the wall for this purpose, since the wall and devices fabricated according to my invention may be otherwise used.

One object of the invention is to provide a machine of the reciprocating press type having co-acting and related elements which, in each operation of the machine, serve to mount a bung ring or sput in a wall of sheet material.

Another object of the invention is to provide an improved machine having a pair of relatively movable members carrying dies so constructed and arranged that in each operation of said members a blank is formed with an opening and a bung ring or sput is mounted in and secured to the walls of the opening.

Another object of the invention is to provide an improved machine, which, in each operation, shapes a sheet metal blank and mounts a bung ring or sput in the blank.

Another object of the invention is to provide an improved machine which is relatively simple and which is capable of performing a plurality of operations substantially simultaneously to mount a bung ring or sput in a sheet metal wall.

Another object of the invention is to provide an improved machine comprising sets of stamping elements and dies so related that, in each operation of the machine, the blank is shaped to form the container wall, a hole is formed in the wall and a bung ring is mounted in the hole and secured to the surrounding walls thereof.

Another object of the invention is to provide an improved machine, of relatively simple construction and which by a plurality of substantially simultaneous operations, is capable of rigidly mounting on a sheet metal wall one or more devices, whereby saving in labor results.

Another object of the invention is to provide an improved sheet metal fabricating machine of the above character in which the device to be mounted in the sheet metal is incorporated with the forming dies and co-acts with certain thereof to form the metal in close fitting engagement with the device, whereby the metal of the sheet is formed to the exact size and shape of the device and the latter is more securely fixed to the sheet to prevent looseness or leakage.

A further object of the invention is to provide an improved process of attaching devices to a sheet metal wall.

Other objects of the invention will be apparent to those skilled in the art to which my invention relates from the following description taken in connection with the accompanying drawings wherein, Fig. 1 is a front elevation of a machine embodying the invention and capable of carrying out the herein disclosed process, parts being in section.

Fig. 2 is a section on the line 2—2 of Fig. 1.

Fig. 3 is a section on the line 3—3 of Fig. 2.

Fig. 4 is a section on the line 4—4 of Fig. 2.

Fig. 5 is a detail view partly in section on the line 5—5 of Fig. 2.

Fig. 6 is a section, enlarged, and illustrating the upper and lower die members in separated relation, corresponding to the line 6—6 of Fig. 4, with a blank between them and the lower die member carrying two bung rings for mounting in the blank.

Fig. 7 is a view similar to Fig. 6, but showing the die members moved into operated position and completing the shaping of the blank and mounting of two bung rings thereon.

Fig. 8 is a fragmentary section showing supplemental operation for setting the bead or rim, this section being partly on the line 2—2 and partly on the line 8—8 of Fig. 1.

Fig. 9 is a fragmentary section on the line 9—9 of Fig. 10, showing the position of the die elements when the die members separate one relative to the other.

Fig. 10 is a section on the line 10—10 of Fig. 9.

Fig. 11 is a plan view of the wall of a container having its marginal portion shaped for assembly with another wall thereof and provided with two bung rings or sputs, according to my process and fabricated by the machine herein disclosed.

Fig. 12 is a section on the line 12—12 of Fig. 11.

Fig. 13 is a fragmentary plan view, enlarged, on the line 13—13 of Fig. 12.

Fig. 14 is a fragmentary section on the line 14—14 of Fig. 13.

Figs. 15 and 16 are sections on the lines 15—15 and 16—16, respectively, of Fig. 13.

Fig. 17 is a fragmentary plan of a sheet metal wall showing mounted therein a bung ring of a construction different from that shown in Figs. 6 to 16, inclusive.

Fig. 18 is a section on the line 18—18 of Fig. 17.

Figs. 19 and 20 are views similar to Figs. 17 and 18, respectively, but showing another form of bung ring.

Figs. 21 and 22 are views similar to Figs. 17 and 18, respectively, but showing a still further form of bung ring.

Figure 23:
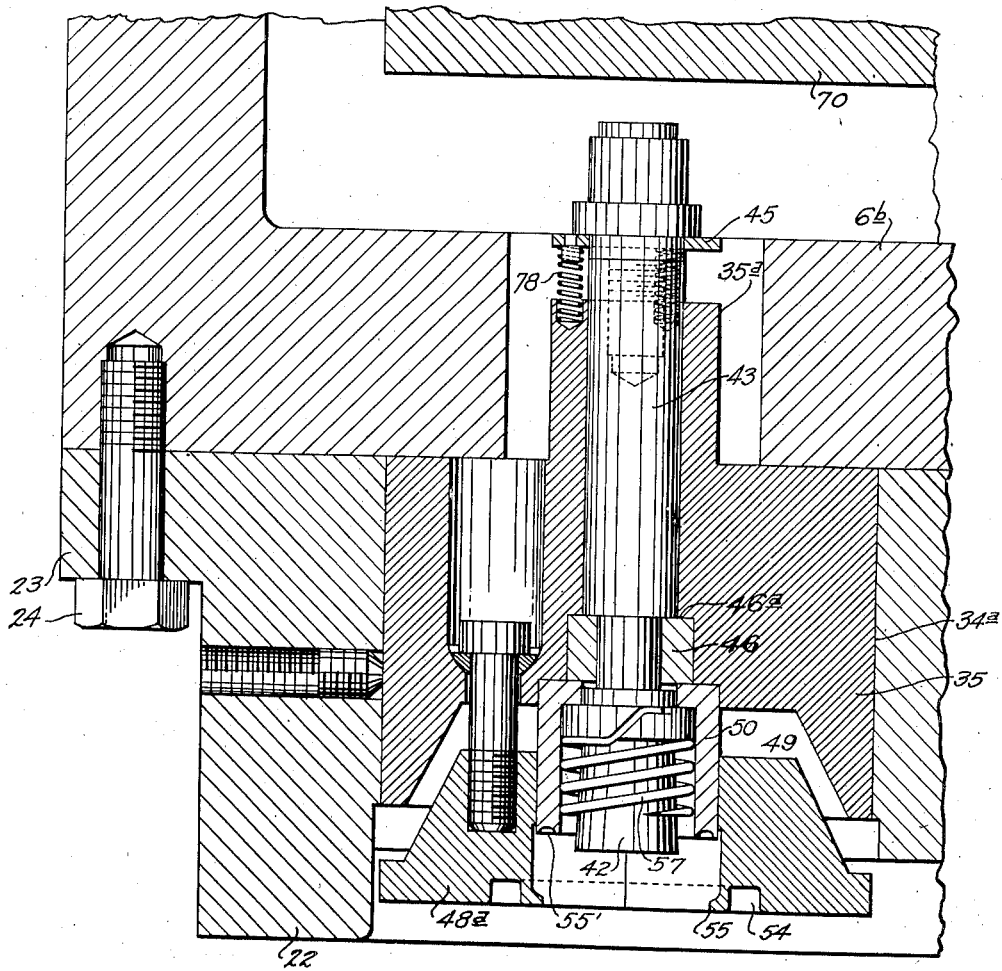

Fig. 23 is a fragmentary section similar to a portion of Fig. 6, but showing a modified form of construction.

In the drawings, 1 indicates as an entirety a press. The frame of the press comprises side members 2, preferably connected at their upper ends by an arch 3. At its lower portion, the frame 1 is shaped to provide seats 4 for a bolster plate 5. 2a indicates side plates secured to the side members 2 and forming guides for a slide 6, which, through pitmen 7 and throws or cranks on a shaft 9, is reciprocated vertically. 10 is a gear keyed to a sleeve which is loosely mounted on one end of the shaft 9. The gear is connected to the shaft by a suitable clutch 11. The gear 10 is illustrated herein as driven by a pinion 10a, fixed to a jack shaft 10b. The shaft 10b is provided with loose and fast pulleys, power being applied to the latter to effect reciprocation of the slide 6. The operation of the clutch is controlled by a link 12, connected to a foot pedal 13.

The clutch 11 is of the type which releases the shaft 9 from the gear 10 following each down-stroke of the slide 6 and as it approaches the end of its up-stroke, a brake 14 is utilized as a safety device.

As the press 1 is of the usual form of construction, further description thereof will not be necessary.

The bolster plate 5 and slide 6 preferably carry in opposed relation three sets of shaping or forming elements and two sets of stamping or punching elements, each set of stamping or punching elements being incorporated with and cooperatively related to one of the sets of shaping elements for conjoint operation therewith. Where one bung ring or other device is to be mounted on the blank A, but one set of shaping elements and one set of punching elements conjointly related thereto are required. One set of shaping elements, indicated as an entirety at 15, serves to shape sheet metal blanks A (see Fig. 6), for example, the heads B (see Figs. 11 and 12) of cylindrical containers, each head when shaped being preferably provided with a side wall b and a flange b', the latter being utilized to connect the head to the body of the container, as by a double seaming process. The container (not shown) may be other than cylindrical in cross section; and in carrying out my process the invention is not limited to shaping elements 15 in which the blank A is provided with the wall b and flange b' or either thereof, as such set of shaping elements may serve to stamp the blank to the desired shape and size or it may operate on a blank previously stamped out to provide the latter with a side wall b and also with a flange b'.

16 indicates as an entirety a set of forming or shaping elements and the set of stamping or punching elements incorporated and co-operating therewith. In the illustrated construction, I provide on the bolster plate 5 and slide 6 two combined sets of forming or shaping and stamping elements 16, each combined set comprising, punching, forming and curling elements and serving to mount in the blank A a bung ring or other member. Where the fabricated wall is to be used as the head of a container, one bung ring may be relatively large, as shown at C, and the other bung ring may be smaller, as shown at D. Either opening may be used for filling or emptying and the other may be used as a vent. Where bung rings C, D, are mounted in the blank, their inner walls being threaded, they may receive and support equipment other than threaded closing plugs, for example, faucets. The combined sets of elements 16 operate simultaneously also substantially simultaneously with the set of shaping elements 15, so that in each complete stroke of the slide 6, a container head provided with a flange and two bung rings C, D, is fabricated ready for assembly with the side wall of a container. The combined sets of stamping, punching, forming and curling elements 16 are removably mounted on the bolster plate 5 and slide 6, whereby either or both may be removed. Such removal permits the substitution of other sets of stamping, punching, forming and curling elements, whereby different sizes and constructions of bung rings may be mounted on the blank A, examples of different constructions of bung rings being herein disclosed.

Of the set of shaping elements 15, 17 indicates a base member, having an annular recess 17a and lugs 17b, the latter being secured to the bolster plate 5 by bolts 17c. 18 indicates a ring fitted in the recess 17a against its outer side wall and secured in position by cap screws 19. The upper inner edge 20 of the ring forms a blanking die with which a blanking punch 21 co-acts to stamp the blank A to the desired size. The blanking punch 21 is provided on the outer edge of a ring 22, having lugs 23, which are suitably secured to the slide 6 by bolts 24. The inner side wall of the ring 22 forms an upper draw die 25, which co-acts with a lower draw die 26, provided on the inner side wall of the recess 17a, and a pressure ring 27 slidable vertically in the recess 17a between its inner side wall and the ring 18, whereby the blank A is provided with the side wall b and flange b' in the down-stroke of the slide—see Fig. 7. The downward movement of the ring 27 is limited by its engagement with the bottom wall of the recess 17a. The pressure ring 27 is suitably secured to pins 28, slidably mounted in openings 29 formed in the base 17. The lower ends of the pins 28 are mounted in a plate 30, which is yieldingly pressed upwardly by a plurality of springs 31, the latter being suitably supported at their lower ends in cradles 32. The plate 30 slidably fits the inner walls of the frame 1. The springs 31 serve normally to maintain the plate 30 against the bolter plate 5 (Figs. 1 and 2), in which position the pressure ring is moved to a plane slightly above the blanking die 20 and acts as a rest for the blank A when the latter is inserted into the machine, as shown in Fig. 6.

As the sets of combined punching, forming and curling elements for mounting the bung rings C, D, are similar in construction and operation, the description of one set, for example, the set for mounting the bung ring C in the blank will suffice for both. Referring to Figs. 3 to 10, it will be noted that the base 17 and the body portion of the member, on which the ring 22 is mounted (such portion and ring being shown integral), are formed with recesses 33, 33a, respectively, to removably receive blocks 34, 35, respectively, carrying the punching, forming and curling elements to be later referred to. The block 34 is removably secured in the recess 33 by cap screws 36 and its outer side wall forms a portion of the draw die 26, between the side walls of the recess 33, as will be understood from Figs. 4 and 6. The block 35 is removably held in the recess 33a by a bolt 37. The block 35 is provided with a hollow boss or tubular member 35a extending upwardly into an opening 6a formed in the slide 6. The purpose of the tubular member 35a will later appear. The opening 6a is elongated to permit the substitution of other forming elements where the center or axis of the latter is on a different radius relative to the axis of the blank A. The block 34 and base 17 are provided with registering openings 38, 39, respectively, the purpose of which will later appear. The upper portion of the opening 38 is enlarged as shown as 38a, to form a recess, which receives an annular member 40. The openings 38, 39, are preferably slightly larger than the opening through the member 40. The member 40 is provided with an upwardly extending tubular member 41. The upper end of the member 41 serves as the blanking die with which a punch 42 co-acts to stamp out of the blank A a section a (see Fig. 7) and thus form therethrough an opening, whereby the bung ring may be mounted in the latter and interlocked to the walls of the blank surrounding the opening. The punch 42 is provided on the lower end of a shank 43, slidably mounted in the boss 35a. The upper end of the shank 43 is provided with a collar 45, which engages the upper surface of the slide or boss 35a to limit the downward movement of the shank relative to the block 35 and slide 6 when the latter is moving upwardly; the upward relative movement of the shank is limited by a collar 46, which engages the bottom wall of a recess 46a, formed in the block 35 in a manner to be later set forth. The collar 45 is held in position on the upper end of the shank 43 by a bolt 47' threaded into the latter. By turning the bolt, the distance between the collar 45 and collar 46 is varied to adjust the length of movement of the shank 43 in the boss 35a.

The upper face of the member 40 surrounding the tubular member 41 is preferably disposed in a plane slightly below the upper surface of the block 34, so that such face, inner wall of the recess 38a and outer wall of the tubular member 41 may form a seat for the flange portion of the bung ring, the neck of the bung ring slidably fitting the tubular member 41, but terminating at a point below its upper end, as clearly shown in Fig. 6.

My machine is adapted to mount various types of bung rings on sheet metal walls, but for illustrative purposes I have herein shown various forms of bung rings of the type comprising generally a neck or body portion, having a portion of its inner wall threaded, one end of the neck terminating in a non-threaded, relatively thin wall adapted to be bent or curled outwardly in radial directions and its other end being provided with an outwardly extending flange.

The set of combined punching, forming and curling elements 16 herein illustrated and combined with the set of shaping elements 15 is constructed to mount in or upon the blank A bung rings C and D of the construction shown in the application of Fredrick J. Runser and myself filed December 6, 1930, Ser. No. 500,487 (see Letters Patent No. 1,920,807, dated August 1, 1933). In the particular form of bung ring shown in Figs. 6, 7, 11, 12, 13, 14, 15 and 16, the bung ring comprises a neck E internally threaded at e and terminating in a non-threaded relatively thin wall F (Fig. 6), which is bent or curled outwardly radially as shown at f (Figs. 7, 12, 15 and 16), as later set forth. At its other end the neck E is provided with an outwardly extending flange G and the outer portion of the latter is bent inwardly, that is, toward the wall F, to form a collar g. The free or end edge of the collar g is provided with spaced projections or high and low portions g' (Fig. 14) with which the metal of the blank is interlocked, as later explained.

47 indicates a ring slidably fitting the tubular member 41 within the thin terminating wall F and seated against the threaded portion of the neck E, but extending beyond the free edge of the wall F, as shown. The purposes of the ring will be set forth hereinafter.

The elements carried by the slide 6 and conjointly related to the punch 42, comprise the following: 48 indicates a die consisting of related, relatively movable sections 48a. The sections of the die are mounted in a recess 49 formed in the block 35, and surround and slidably fit an annular skirt 50. The skirt 50 is provided with a flange 50a removably fitting the shank 43 and rigidly held thereon against a disk 52, integrally provided on the lower portion of the shank 43, by the collar 46. The collar 46 is split (to permit its assembly and disassembly) and fits within a recess 51a formed in the shank 43, the sections of the collar being wedged in between the flange 50a and the upper wall of the recess 51a to secure the shank and skirt in rigid relation, but to permit removal of the skirt for a purpose later set forth. The collar 46 is also removable so that collars of greater or lesser thickness may be substituted, whereby adjustment of the punch 42 relative to the active faces of the die sections may be effected for different gages of the sheet metal. The upper walls of the die sections 48a have tapered portions and the walls of the recess 49 have correspondingly shaped portions, so that in the downward movement of the slide 6, the die sections 48a are held in rigid relation to co-act with the walls of the bung ring C and block 34 (see Fig. 7), but in the upward movement of the slide 6, the die sections gravitate away from the walls of the recess 49, (see Fig. 6) for a purpose to be later set forth.

The active faces of the die sections 48a are formed with recesses 54, which are concentric to the axis of the shank 43 and skirt 50, and in transverse cross section they are substantially arc-shaped, whereby the active faces of the die sections may engage the metal at opposite sides of the collar g, so that such faces at opposite sides of the recesses 54, in forcing the blank into engagement with the block 34 and flange G, will draw the blank over the up-standing high and low portions g' of the collar g, the result being that the metal of the blank is interlocked with the end walls of the high portions g', as shown in Fig. 14. Accordingly, in the operation of the slide 6, the metal of the blank A is formed or drawn over the collar g into engagement with the flange G and block 34, with the metal of the blank in interlocking engagement with the high and low portions g' of the collar g.

Also in this downward movement of the slide 6, the inner arc-shaped edges 55 of the die sections 48a co-act first with the tubular member 41, then with the ring 47 and finally with the neck E of the bung ring to shape the metal of the blank surrounding the opening resulting from the action of the punch 42, into an annular wall a' corresponding exactly to the shape and size of the bung ring neck E. As will be noted, the action of the forming edges 55 is such as to compress the metal tightly against the bung ring neck E, thereby minimizing danger of leakage or looseness, as well as sizing of the wall $a'$ to to the neck E. 55' indicates a curling or beading device provided on the bottom edge of the skirt 50. The device 55' is arranged to engage the thin terminating wall F of the bung ring and curl or bead it over the free edge of the wall $a'$, as shown at $f$, in the downward movement of the slide. As will be understood from Fig. 7, in the downward movement of the slide 6, the active faces of the die sections 48a and beading device 55' have a fixed, spaced relation, depending upon the length of the annular wall $a'$, so that this beading operation takes place following the forming of the annular wall $a'$ or substantially at the time the forming edges 55 press the metal of the blank into final position against the inner face of the bung ring flange G. Where the relation of the curling or beading 55' and active faces of the die sections is required to be changed, due to the length of the wall $a'$, a skirt 50 having the desired length may be substituted, or in some instances a washer may be interposed between the flange 50a and disk 52, upon the removal of the collar 46 and substitution of a collar of the required size.

The ring 47 hereinbefore referred to serves the following purposes: it spaces the free or outer end portion of the wall F from the skirt 50 and holds it in operative relation to the beading device 55'; and it prevents beading of the wall F inwardly instead of outwardly.

To insure separation of the ring 47 from the skirt 50 and punch 42, I provide a knock-out means therefor. These means preferably comprises a spring 57 mounted within the skirt 50 and normally acts on the ring 47 when the upper die elements approach the lower die elements. The spring 57 is held in position within the skirt 50 by extending its inner end upwardly and threading such end through a notch or groove 57a formed in the collar 52 and bending its free end laterally.

The die sections 48a are movably supported as follows: each section is provided in its upper portion with a threaded opening for a bolt 58. The bolt 58 extends upwardly through an opening 59 into a recess 60 formed in the block 35. The bottom of the recess 60 surrounding the opening 59 is rounded to form a bearing for a collar 61 fitting the bolt 58 and adapted to rest against its head. The lower surface of the collar 61 is rounded to fit the bearing and thus permits the bolt and the die sections carried thereby to swing laterally as shown in Fig. 9. The opening 59 is large enough to permit the bolt 58 to $(a)$ move endwise when the die sections move into engagement their tapered seats 49 (see Fig. 7) or gravitate away therefrom in the upward movement of the slide and $(b)$ swing laterally, as shown in Fig. 9, whereby the active edges of the die sections are free to ride the bead $f$ in the upward or receding movement of the slide 6. As the heads of the bolts 58 are larger than the collar 61, it will be seen that they support the die sections 48a in suspended position in the upstroke of the slide 6 and in its down-stroke until they engage blank A.

From the foregoing description it will be seen that the bead $f$ serves to hold the bung ring in rigid or fixed engagement with wall of the blank and the walls of the metal being interlocked with the high and low portions $g'$, prevent turning of the bung ring relative to the blank wall. As the high and low portions $g'$ are defined by walls at right angles to their free edges and the metal of the wall A is drawn over the edges formed by these right angled walls (see Fig. 14), it will be seen that by riveting or beading the wall F tightly over the annular wall $a'$, the bung ring is permanently mounted in the blank A.

Due to the variations in the quality and thickness of the sheet metal blanks A and incidentally to the wear of the forming and curling elements, I prefer to provide mechanism, indicated as an entirety at 56, for independently moving the skirt 50 downwardly relative to the die sections 48a following the engagement of the latter and forcing of the metal into engagement with the flange G and collar $g$, or immediately following the instant that the slide 6 reaches the end of its down stroke, the effect of this relative movement being to force the device 55' against the curled over wall F and give the latter a final blow or knock to bead it over the wall $a'$ and thus insure a sealing as well as a fixed relation between the metal of the blank and the bung ring flange G. Of the mechanism 56 for moving the curling device 55', 62 indicates a pair of plates secured at their lower ends to the opposite sides of the cross member 63 of the slide 6, and extending upwardly therefrom in front and rear of the shaft 9. At their upper ends the plates 62 are formed with elongated slots 64 through which bolts 65 extend, the bolts being threaded into and supported by the arch 3. The bolts engage the walls of the slots 64 and thus serve to guide the plates in their up and down movements with the slide 6. The heads of the bolts maintain the plates in sliding engagement with spacing sleeves 66 surrounding the bolts and interposed between the plates and the arch 3, to thereby guide the upper ends of the plates and maintain them in spaced parallel relation. 67 indicates as an entirety a frame supported on the slide 6 and plates 62 and movable therewith and also relative thereto. The frame 67 comprises a cross head 68 having a plurality of depending rods 69 which connect an operating member 70 rigidly to the cross head 68. The opposite ends of the cross head are cut away, as shown at 71, to form guide walls to slidably engage the plates 62. To guide the frame 67 in its up and down movements relative to the plates 62, I provide projecting pins 72, which extend through elongated slots 73 formed in the plates 62. The rods 69 are secured to the cross head 68 and member 70 in any suitable manner. The operating member 70 is superposed above the base portion 6b of the slide 6 and disposed in the space between such portion and the cross bar 63, the rods 69 depending down from the cross head 68 upon opposite sides of the cross bar so as to support the front and rear portions of the member 70. From the foregoing description it will be seen that the member 70 is disposed above the upper ends of the shanks 43 of the sets of combined stamping, forming and curling elements 16. The member 70 is normally acted upon a by a plurality of compression springs 73 interposed between it and the base portion 6b, the effect of which springs is to maintain the frame 67 in its up-position relative to the silde 6, the normal action of the springs being limited by the engagement of the plate 70 with the cross bar 63. The action of the springs is such as to normally connect the frame 67 to the slide 6 so as to move therewith, except when movement of the frame 67, as later described takes place, such movement being against the tension of the springs. To effect operation of the frame 67, I provide on the shaft 9, at either side of the plane of the guide plates 62, strikers 74, which are secured to the shaft in any suitable manner. The strikers are on the upper side of the shaft when the slide 6 is at the end of its up-stroke; accordingly, at the time the slide 6 reaches the end of its down-stroke the strikers engage the cross head 68 and move it downwardly with relatively great force, which is transmitted through the thrust rods 69 to the operating member 70; the member 70 in turn strikes the upper ends of the shanks 43, as shown in dotted lines in Fig. 8, and moves the latter, skirt 50 and beading or curling device 55' relative to the block 35 and die sections 48a and rivets over or beads the wall F into final sealing position. The cross head 68 is preferably provided with rollers 75 with which the strikers 74 engage and ride as the shaft rotates in each operation. As will be understood, due to the engagement of the punch 42 with the blanking die 41, the shanks 43 are moved to the position shown in Fig. 8 prior to the engagement therewith by the strikers 74.

Where the bung rings C, D, are of different sizes and require movement of the curling devices 55' different distances, the tubular member or collar for the shank 43 requiring the longer movement is of greater height than the tubular member of the other collar 45, to make the effective length thereof longer so that the operating member will engage the longer shank in advance of the shorter shank.

Figure 1:
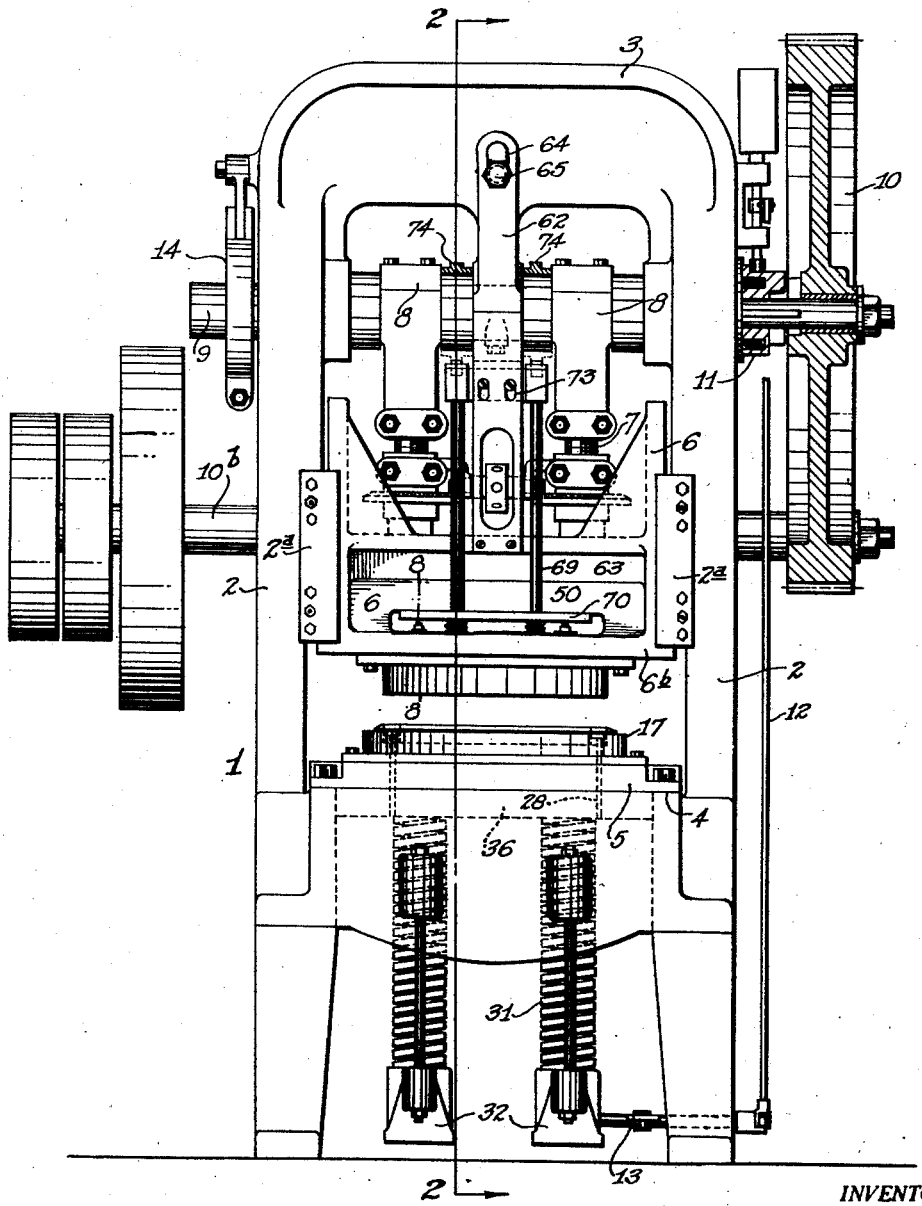

Operation: with the slide in the up-position, as shown in Figs. 1, 2, bung rings C and D are seated on the annular wall 40 and gaskets H are positioned on the flanges G of the bung rings; next the spacing and guiding rings 47 are positioned over the punching dies 41 and within the walls F of the bung ring necks E; next, a blank A is positioned between the sets of dies 15, 16, 16, as shown in Fig. 6; and then the foot pedal 13 is operated, which applies power to the shaft, thereby operating the slide 6 down and up. As the slide 6 approaches the bolster plate 5, the die sections 48a and punch 42 engage the blank and are forced into their receiving recesses as the down movement continues, the shanks 43 thereby being elevated to the position shown in Fig. 8. The walls of these recesses then arrest the relative movement of these parts, so that they are carried downwardly with the slide for co-action with the blanking and die elements carried by the bolster plate. As shown, the shaping elements 15 co-act as already set forth. The punch 42 stamps out the section a, which drops through the openings 38, 39, and forms an opening in the blank, following which the blank is shaped by the die elements 15, the annular wall a' is formed, the metal drawn over the collar g and interlocked with the high and low portions g' thereof, and the wall F is beaded over the wall a'. At the time the slide 6 reaches the end of its down-stroke, the strikers 74 engage the cross head and through the frame 67 force the shanks 43 downwardly, whereby the beading devices 55' move independently of the other die elements and bead or curl the wall F into final sealing position. As the slide 6 moves upwardly, the springs 57 act on the rings 47 and separate them from engagement with the elements carried by the slide 6.

When it is found desirable, the curling device 55' may be adjusted so as not to effect curling of the wall F in the downward movement of the slide 6, but to effect curling of this wall when moved independently of the slide 6 by the mechanism 56. When the parts are adjusted for operation in this manner, adjustment is made to permit the shanks 43 to have a longer endwise movement when actuated by the mechanism 56 and by preference the shanks 43 are normally maintained in elevated position, as shown in Fig. 23, to which reference will later be made.

Figs. 17 to 21, inclusive, show other forms of bung rings which may be mounted in a sheet metal wall A according to my process and machine such as illustrated in Figs. 1 to 10, inclusive, by substituting therein forming and curling elements corresponding to the shape of the bung ring flange and bung ring neck. In Figs. 17 and 18 I show a bung ring the flange G' of which is provided with a plurality of extensions I and the metal of the blank is up-set as shown at J, the up-set portions being spaced to receive between them the extensions I. In this arrangement the extensions are interlocked between the up-set portions J to prevent turning of the bung ring, whereas the beaded over wall F seals the bung ring in position. In Figs. 19 and 20 I show a bung ring having a flange $G^2$, the periphery of which is circular and seats into a pocket K formed in the wall A. In this form of construction the outer wall of the neck E is of polygonal shape as shown at $e'$, and the annular wall $a''$ provided on the blank A is of corresponding shape, thereby providing an interlock between the bung ring and the walls of the blank, to prevent rotative movement of the bung ring, the beaded over wall F serving to secure the bung ring in its seat.

In Figs. 21 and 22 I illustrate a form of construction in which the bung ring is provided with a flange $G^3$ the periphery of which is of polygonal shape and seats into a correspondingly shaped pocket, so that the bung ring is held against turning and the wall F of the bung ring is riveted over as shown at $f$ to secure the bung ring in its seat. From the foregoing description it will be seen that each bung ring is interrelated and combined with the shaping or forming elements and the blanking elements so as to serve as one co-acting element to form the annular wall $a'$, which constitutes the seat for the bung ring neck E. This arrangement and operation is one reason among others which permits me to carry out my process and by a single cycle of movement of the slide, that is, a down-stroke and an up-stroke thereof, to form an opening in the blank, shape its walls and secure the blank and bung ring in permanently assembled relation.

In Fig. 23 I have shown a modification of the construction in which the shank 43 is normally maintained in elevated position, the purpose of which is to prevent gravitation of the shank 43 and skirt 50, due to wear of the shank or its guide walls, and premature engagement of the curling device 55' with the wall $a'$ in the downward movement of the slide. In this form of construction I provide between the collar 45 and the upper end of the boss 35a a plurality of springs 78, which normally act to maintain the shank and the parts carried thereby in their up-position, that is, with the collar 46 in engagement with the wall 46a.

My construction is also adapted to operate upon blanks A in which openings for the bung rings have been previously formed. When such blanks are employed, the punching element 42 is omitted.

To those skilled in the art to which my invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. In apparatus of the class described, the combination of a pair of relatively movable members, a seat on one of said members for a bung ring having a neck and laterally extending portions at one end of the latter, and a set of co-operable elements on said members successively operated by the relative movement of said members, in each operation thereof one toward the other, to first form an opening in a blank positioned between said members, provide an annular wall around said opening and to bend the opposite end of the neck over the outer end of the annular wall.

2. In apparatus of the class described, the combination of a pair of relatively movable members, a seat on one of said members for a bung ring having a neck and laterally extending portions at one end of the latter, a set of co-operable elements on said members successively operated by the relative movement of said members, in each operation thereof one toward the other, to first form an opening in a blank positioned between said members, provide an annular wall around said opening and to bend the opposite end of the neck over the outer end of the annular wall, and auxiliary means operable subsequently to the operation of said members, for moving certain of said elements independently of the movement of said members.

3. In apparatus of the class described, the combination of a pair of relatively movable members, a seat on one of said members for a bung ring having a neck and laterally extending portions at one end of the latter, and a set of co-operable elements on said members and operated by the relative movement of the latter in each operation thereof one toward the other, to first form an opening in a blank positioned between said members, distend the metal of the blank to provide an annular wall around the opening, form the wall of the blank around the annular wall into interlocking engagement with the laterally extending portions of the bung ring and to bend the opposite end of the bung ring neck over the outer end of the annular wall.

4. In apparatus of the class described, the combination of a pair of relatively movable members, a seat on one of said members for a bung ring having a neck and laterally extending portions at one end of the latter, a set of co-operable elements on said members operated thereby in each operation of said members one toward the other, to first form an opening in a blank positioned between said members, distend the metal of the blank to provide an annular wall around the opening, form the wall of the blank around the annular wall into interlocking engagement with the laterally extending portions of the bung ring neck and to bend the opposite end of the bung ring neck over the outer end of the annular wall, and auxiliary means for operating certain of said elements independently of the movement of said members.

5. In apparatus of the class described, the combination of a pair of relatively movable members carrying peripheral complementary die or shaping elements arranged to shape the peripheral portion of a blank, means for effecting relative movement of said members, and means carried by said members within said elements and operating substantially simultaneously therewith for punching a hole in the blank and substantially simultaneously mounting therein a bung ring and securing the latter to the wall of the blank.

6. In apparatus of the class described, the combination of a pair of relatively movable members carrying peripheral complementary die or shaping elements arranged to shape the peripheral portions of a blank, means for effecting relative movement of said members, and means carried by said members within said elements and operating substantially simultaneously therewith for punching a hole in the blank and substantially simultaneously mounting therein a bung ring and securing the latter to the wall of the blank, said means being detachably mounted on said members.

7. In apparatus of the class described, the combination of a pair of relatively movable members, a seat on one of said members for a bung ring having a neck and laterally extending portions at one end of the latter, a set of co-operable elements on said members, one element on the other said member being arranged to co-act with the bung ring neck, said elements being operated by said members in each operation thereof one toward the other, to first form an opening in a blank positioned between said members, form an annular wall around said opening and to curl the opposite end of the neck over the outer end of said annular wall, and means associated with the elements carried by the movable one of said members for independently moving said curling element.

8. In apparatus of the class described, the combination of a pair of relatively movable members, a blanking die and a seat on one of said members for a bung ring having a neck arranged to surround said die and laterally extending portions at one end of the neck, and elements on said other member co-acting with said die and the bung ring neck and laterally extending portions thereof in each operation of said members successively to stamp out a section of a blank positioned between said members, form an annular wall around the neck and a seat over and around the laterally extending portions.

9. In apparatus of the class described, the combination of a pair of members, means for moving one member toward the other member, a seat on one of said members for a device, having a neck, to be mounted on a sheet metal blank, and a set of punching, forming and curling elements on said members arranged to co-act with each other and walls of the device to blank-out an opening in the blank, form an annular wall around the neck and curl the metal of the neck over the free end of the wall, said set of elements being operable in each movement of said movable member toward and from the other member.

10. In apparatus of the class described, the combination of a pair of members, means for moving one member toward the other member, a seat on one of said members for a device, having a neck, to be mounted on a sheet metal blank, and a set of punching, forming and curling elements on said members arranged to co-act with each other and neck of the device to blank-out an opening in the blank and form an annular wall around the neck, and curl the metal of the neck over the free end of the wall, said set of elements being operable in each movement of the movable member toward and from the other member, the forming elements that co-act with the neck having a shape corresponding to the outer wall thereof.

11. In apparatus of the class described, the combination of a pair of members, means for moving one member toward the other member, a seat on one of said members for a device, having a neck, to be mounted on a sheet metal blank formed with an opening, and a set of forming and curling elements on said members arranged to co-act with each other and walls of the device to form an annular wall around the neck and curl the metal of the neck over the free end of the wall, said set of elements being operable in each movement of said movable member toward and from the other member.

12. In apparatus of the class described, the combination of a pair of members, means for moving one member toward the other member, a seat on one of said members for a device, having a neck, to be mounted on a sheet metal blank formed with an opening and a set of forming and curling elements on said members arranged to co-act with each other and neck of the device to form an annular wall around the neck and curl the metal of the neck over the free end of the wall, said set of elements being operable in each movement of the movable member toward and from the other member, the forming elements that co-act with the neck having a shape corresponding to the outer wall thereof.

13. In apparatus of the class described, the combination of a pair of members, means for moving one member toward the other member, a seat on one of said members for a device, having a neck, to be mounted on a sheet metal blank, a set of punching, forming and curling elements on said members arranged to co-act with each other and walls of the device to blank-out an opening in the blank, form an annular wall around the neck and curl the metal of the neck over the free end of the wall, said set of elements being operable in each movement of said movable member toward and from the other member, and means for changing the relation between the punching element on one of said members and the adjacent forming element.

14. In apparatus of the class described, the combination of a pair of members, means for moving one member toward the other member, a seat on one of said members for a device, having a neck, to be mounted on a sheet metal blank, a set of punching, forming and curling elements on said members arranged to co-act with each other and walls of the device to blank-out an opening in the blank, form an annular wall around the neck and curl the metal of the neck over the free end of the wall, said set of elements being operable in each movement of said movable member toward and from the other member, and means for changing the relation between the curling element and the adjacent forming element.

15. In apparatus of the class described, the combination of a pair of members, means for moving one member toward the other member, one of said member being provided with a seat for a device, having a neck, to be mounted on a sheet metal blank and a tubular member extending through the neck of the device to provide a blanking die, and a set of punching, forming and curling elements on the other member arranged to co-act with said blanking die and neck of the device to blank-out an opening in the blank, form an annular wall around the neck and curl the metal of the neck over the free end of the wall, said set of elements being operable in each movement of the movable member toward and from the other member.

16. In apparatus of the class described, the combination of a pair of members, means for moving one member toward the other member, a seat on one of said members for a device, having a neck, to be mounted on a sheet metal blank, and a set of forming and curling elements on said other member arranged to co-act with each other and walls of the device to form an annular wall around the neck and curl the metal of the neck over the free end of the wall, said set of elements being operable in each movement of said movable member toward and from the other member, and said forming elements being mounted to move outwardly relative to each other in the receding movement of said movable member.

17. In apparatus of the class described, the combination of a pair of members, means for moving one member toward the other member, a seat on one of said members for a device, having a neck, to be mounted on a sheet metal blank formed with an opening, a set of forming and curling elements on said members arranged to co-act with each other and walls of the device to form an annular wall around the neck and curl the metal of the neck over the free end of the wall, said set of elements being operable in each movement of said movable member toward and from the other member, and means for moving said curling element relative to said forming elements.

18. In apparatus of the class described, the combination of a pair of members, means for moving one member toward the other member, a seat on one of said members for a device, having a neck, to be mounted on a sheet metal blank formed with an opening, a set of forming and curling elements on said members arranged to co-act with each other and walls of the device to form an annular wall around the neck and curl the metal of the neck over the free end of the wall, said set of elements being operable in each movement of said movable member toward and from the other member, and means for moving said curling element relative to said forming elements at the end of the active stroke of said movable member.

19. In apparatus of the class described, the combination of a pair of members, means for moving one member toward the other member, one of said members being provided with a seat for a device, having a neck, to be mounted on a sheet metal blank and a tubular member extending through the neck of the device to provide a blanking die, a ring removably fitting around said tubular member within the neck of the device, and punching, forming and curling elements on the other member arranged to co-act with said blanking die and neck of the device to blank-out an opening in the blank, form an annular wall around the neck and curl the metal of the neck over the free end of the wall, said elements being operable in the movement of the movable member toward and from the other member.

20. In apparatus of the class described, the combination of a pair of members, means for moving one member toward the other member, one of said members being provided with a seat for a device, having a neck, to be mounted on a sheet metal blank and a tubular member extending through the neck of the device to provide a blanking die, a ring removably fitting around said tubular member within the neck of the device and terminating at its upper end at a point between the upper ends of said tubular member and the neck, and punching, forming and curling elements on the other member arranged to co-act with said blanking die, said ring and neck of the device to blank-out an opening in the blank, form an annular wall around the neck and curl the metal of the neck over the free end of the wall, said elements being operable in the movement of the movable member toward and from the other member.

21. In apparatus of the class described, the combination of a pair of members, means for moving one member toward the other member, one of said members being provided with a seat for a device, having a neck, to be mounted on a sheet metal blank and a tubular member extending through the neck of the device to provide a blanking die, a ring removably fitting around said tubular member within the neck of the device, punching, forming and curling elements on the other member arranged to co-act with said blanking die and neck of the device to blank-out an opening in the blank, form an annular wall around the neck and curl the metal of the neck over the free end of the wall, said elements being operable in the movement of the movable member toward and from the other member, and means for separating the ring from said elements as said movable member moves away from said other member.

22. In apparatus of the class described, the combination of a pair of members, means for moving one of said members toward and from the other member, one of said members being provided with a seat for a device, having a neck, to be mounted on a sheet metal blank and a tubular member extending through the neck of the device, and forming and curling elements on the other member, said forming element being arranged to co-act with the neck of the device to first form and size the metal of the blank into an annular wall fitting the neck and said curling element being arranged to engage the free end of the neck and curl it over the free end of the wall.

23. In apparatus of the class described, the combination of a pair of members, means for moving one of said members toward and from the other member, one of said members being provided with a seat for a device, having a neck, to be mounted on a sheet metal blank and a tubular member extending through the neck of the device, a ring removably fitting around said tubular member within the neck of the device and extending to a point beyond the free end of the neck, and forming and curling elements on the other member, said forming element being arranged to co-act with the neck of the device to form and size the metal of the blank into a wall fitting the neck and said curling element being arranged to engage the free end of the neck and curl it over the free end of the wall.

24. In apparatus of the class described, the combination of a pair of members, means for moving one of said members toward and from the other member, one of said members being provided with a seat for a device, having a neck, to be mounted on a sheet metal blank and a tubular member extending through the neck of the device, a ring removably fitting around said tubular member within the neck of the device, forming and curling elements on the other member, said forming element being arranged to co-act with the neck of the device to form and size the metal of the blank into a wall fitting the neck and said curling element being arranged to engage the free end of the neck and curl it over the free end of the wall, and means for separating the ring from said tubular member in the receding movement of said movable member.

25. In apparatus of the class described, the combination of a pair of members, means for moving one of said members toward and from the other member, one of said members being provided with a seat for a device, having a neck, to be mounted on a sheet metal blank and a tubular member extending through the neck of the device, a ring removably fitting around said tubular member within the neck of the device, forming and curling elements on the other member, said forming element being arranged to co-act with the neck of the device to form and size the metal of the blank into a wall fitting the neck and said curling element being arranged to engage the free end of the neck and curl it over the free end of the wall, and means for adjusting the relation between said forming element and said curling element.

26. In apparatus of the class described, the combination of a pair of supporting members, means for moving one said member toward and from the other member, one of said members being provided with a seat for a device, having a neck, to be mounted on a sheet metal blank and a tubular member extending through the neck of the device, a shank supported by the other member and provided with a skirt having a curling element on its lower portion, and a forming element surrounding said curling element and in spaced relation thereto, said forming element being arranged to co-act with the neck to form portions of the blank into a wall surrounding and fitting the neck and said curling element being arranged to engage the neck and curl it over the free end of the wall.

27. In apparatus of the class described, the combination of a pair of supporting members, means for moving one said member toward and from the other member, one of said members being provided with a seat for a device, having a neck, to be mounted on a sheet metal blank and a tubular member extending through the neck of the device, a shank supported by the other member and provided with a skirt having a curling element on its lower portion, a forming element surrounding said curling element and in spaced relation thereto, said forming element being arranged to co-act with the neck to form portions of the blank into a wall surrounding and fitting the neck and said curling element being arranged to engage the neck and curl it over the free end of the wall, said forming element comprising a plurality of sections, and means for supporting said sections to move relatively to each other.

28. In apparatus of the class described, the combination of a pair of relatively movable members carrying peripheral complementary die or shaping elements arranged to shape the peripheral portions of a blank with a side wall, means for effecting relative movement of said members one toward and from the other, one said member having a seat for an annular device, and means carried by said members within said elements and operating substantially simultaneously with said elements in the movement of the movable member toward the other member to first form an opening in the blank and form the metal of the blank around the opening into sealing engagement with the walls of the device.

29. In apparatus of the class described, the combination of a pair of relatively movable members carrying peripheral complementary shaping elements arranged to provide a side wall on a blank, a seat on one of said members for a bung ring having a neck and laterally extending portions at one end of the latter, and a set of co-operable elements on said members operating substantially simultaneously with said first mentioned elements in each relative movement of said members, one toward the other, to first form an opening in the blank, form an annular wall around said opening and to curl the opposite end of the neck over the outer end of said annular wall.

30. In apparatus of the class described, the combination of a pair of relatively movable members, carrying peripheral complementary shaping elements arranged to provide a side wall on a blank, a seat on one of said members for a bung ring having a neck and laterally extending portions at one end of the latter, and a set of co-operable elements on said members operated by the relative movement of said members, one toward the other, and arranged to operate substantially simultaneously with said first mentioned elements, to distend the metal of the blank to provide a laterally extending annular wall, and to curl the opposite end of the bung ring neck over the outer end of said annular wall.

31. In apparatus of the class described, the combination of a pair of relatively movable members carrying peripheral complementary die or shaping elements arranged to shape the peripheral portions of a blank to provide the latter with a side wall, means for effecting relative movement of said members one toward the other, a seat on one said member for an annular device, and means carried by said members and operating substantially simultaneously with said elements to first distend the metal of the blank to form a laterally extending wall around said device in engagement therewith, and then to curl one end of the device over the free end of the laterally extending wall.

32. In apparatus of the class described, the combination of a pair of supporting members, one of said members being movable toward and from the other member to complete each operation, a seat on one member for an annular device, means on said other member co-acting with the wall of the device to distend the metal of the blank into a laterally extending annular wall fitting the outer wall of the device, and means for curling one end of the device over the free end of the annular wall, said distending means and said curling means operating successively during each operation of said movable member.

33. In apparatus of the class described, the combination of a pair of members, one movable toward and from the other, means for moving said movable member toward and from the other member, one of said members being provided with a seat for an annular body having a flange at one end and a blanking die within said seat, a punch co-acting with said blanking die to blank-out an opening in a blank, elements on said other member for forming the metal of the blank around the opening into an annular wall fitting the annular body and a pocket fitting its flange, and means on said other member for curling the opposite end of the annular body over the free end of the annular wall.

34. The herein disclosed process of mounting an annular device on a sheet metal wall, which consists in seating the device in concentric relation to a blanking die, then in positioning a sheet metal blank between said die and device and a set of punching, forming and curling elements, then in moving the set of elements toward the die and device and during such movement first blanking-out an opening in the wall, then distending the metal of the blank around the opening into an annular wall sized and fitted to the annular device and finally curling one end of the annular device over the free end of the annular wall.

35. The herein disclosed process of mounting an annular device on a sheet metal wall, which consists in seating the device on a support, then in positioning a sheet metal blank between the device and a set of forming and curling elements, then in moving said set of elements toward the device and during such movement first distending the metal of the blank into an annular wall around the annular device and then curling one end of the device over the free end of the annular wall.

36. The herein disclosed process of mounting an annular device on a sheet metal wall, which consists in seating the device on a support, then in positioning a sheet metal blank between the device and a set of forming and curling elements, then in moving said set of elements toward the device and during such movement first distending the metal of the blank into an annular wall around the annular device, then in imparting a preliminary curl to the free end portion of the annular device over the free end of the annular wall and finally effecting a supplemental curling action on the curled over portion.

37. The herein disclosed process of shaping a sheet metal blank and mounting thereon an annular device, which consists in positioning a blank between a pair of supports having sets of shaping blanking, forming and curling elements and seating an annular device on one of said supports in operative relation to certain of said elements, then in moving one support toward the other support to cause said elements to shape the peripheral portions of the blank, blank-out an opening therein, distend the metal of the blank surrounding the opening into an annular wall sized to the device, and curl over the free end portion of the device into engagement with the free end of the annular wall.

38. In apparatus for mounting flanged bung rings on a sheet metal wall, the combination of a support having an upstanding member and an annular seat therearound for the flanged end of a ring, said member being adapted to extend through the neck of the ring, a support provided with a forming die and a curling device disposed in spaced relation and concentrically to said forming die, one of said supports being movable toward and from the other support and said forming die and said curling device being operable successively in each movement of the movable support toward the other support, said forming die being arranged to engage the neck of the ring and co-operate with said member to form a portion of the sheet metal wall into an annular wall around the neck of the ring and to shape another portion of the sheet metal wall over its flange to provide a seat for the latter and said curling device being arranged to engage the free end portion of the neck and curl it over the annular wall formed therearound, and means for moving one of said supports toward and from the other support.

39. In apparatus for mounting bung rings having a neck and a flange at one end provided with an inturned collar upon a sheet metal wall, the combination of a support having an annular seat for the flanged end of the ring and an upstanding member within said seat adapted to extend through the neck of the ring, a support provided with a forming die formed with recesses alined with the inturned collar and a curling device disposed in spaced relation and concentrically to said forming die, one of said supports being movable toward and from the other support, said forming die and said curling device being operable successively in each movement of the movable support toward the other support, said forming die being arranged to engage a portion of the sheet metal wall to form it into an annular wall around the neck of the ring and to engage other portions of the sheet metal wall at opposite sides of said recesses to shape the sheet metal wall over the inturned collar into engagement with the flange and beyond the collar to provide a seat for the collar and flange and said curling device being arranged to curl the free end portion of the neck over the adjacent end of the annular wall, and means for moving one of said members toward and from the other.

RUDOLPH BLAHO.